(12) United States Patent
Mantani (10) Patent No.: US 8,078,299 B2
(45) Date of Patent: Dec. 13, 2011

(54) OPTICAL DISK REPLAY DEVICE

(75) Inventor: Nobunori Mantani, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1333 days.

(21) Appl. No.: 11/519,017

(22) Filed: Sep. 12, 2006

(65) Prior Publication Data
US 2007/0058953 A1     Mar. 15, 2007

(30) Foreign Application Priority Data

Sep. 13, 2005   (JP) .................. 2005-265395

(51) Int. Cl.
G06F 17/00       (2006.01)
(52) U.S. Cl. ............................................ 700/94
(58) Field of Classification Search ............... 700/94
See application file for complete search history.

(56) References Cited

U.S. PATENT DOCUMENTS

2005/0080500 A1*   4/2005   Kimura ..................... 700/94
2005/0163142 A1*   7/2005   Ishii et al. ................. 370/429

FOREIGN PATENT DOCUMENTS

| JP | 10069725 | 3/1998 |
|----|----------|--------|
| JP | 2001250318 | 9/2001 |
| JP | 2002-344561 | 11/2002 |
| JP | 2004-023216 | 1/2004 |
| JP | 2004005985 | 1/2004 |

OTHER PUBLICATIONS

Japanese Office Action dtd Nov. 19, 2007 in corresponding Japanese patent application.

* cited by examiner

Primary Examiner — Andrew C Flanders
(74) Attorney, Agent, or Firm — Pillsbury Winthrop Shaw Pittman, LLP (57) ABSTRACT

When a break in data is detected by a detection unit, an audio output stoppage command unit commands a digital audio processing device connected to an audio output unit to stop output of audio. A sampling frequency checking unit checks whether or not the sampling frequency of the audio data before the break, and the sampling frequency of the audio data after the break, are the same. When the sampling frequency checking unit detects that these sampling frequencies are the same, an audio output stoppage elimination command unit waits until a fixed time period has elapsed, and then returns the reading position upon the optical disk at which the reading unit reads in data to a position directly after the break, and also commands the digital audio processing device to eliminate the stoppage of output of audio.

1 Claim, 4 Drawing Sheets

OPTICAL DISK REPLAY DEVICE

CROSS REFERENCE

This Nonprovisional application claims priority under 35 U.S.C. §119(a) on Patent Application No. 2005-265395 filed in Japan on Sep. 13, 2005, the entire contents of which are hereby incorporated by reference.

BACKGROUND OF THE INVENTION

The present invention relates to an optical disk replay device which reads in and replays data recorded on an optical disk such as a DVD or the like, and, more particularly, relates to such an optical disk replay device which can utilize a digital amp for the output of voice.

As prior art, an optical disk replay device (hereinafter simply termed a "replay device") which replays audio files and video files recorded upon an optical disk such as a DVD or the like is nowadays in general use. Furthermore, a replay device has also been proposed which can utilize a digital amp for the output of audio, in order to replay the audio at high quality. A digital amp, as is per se well known, is an amp which, based upon inputted audio data, drives a speaker by controlling the switching ON and OFF of a switching element. Furthermore, an optical disk device which incorporates a digital amp has already been proposed.

In such a digital amp, in order to control the switching ON and OFF of the switching element based upon the audio data which is being inputted, a clock signal is required which has the same frequency as the sampling frequency of this audio data. However, the sampling frequency of the audio data which is being inputted to the digital amp is not constant. For this reason there are provided, in a typical digital amp, a detection unit which detects the sampling frequency of the audio data which is being inputted, and a signal generation unit which changes the frequency of a clock signal which it outputs, according to the sampling frequency of the audio data as detected by the detection unit.

In such a digital amp, when the sampling frequency of the audio data which is being inputted has changed, this changed sampling frequency of the audio data is detected by the detection unit, and a certain time period (around 1 to 2 seconds) is typically required until a clock signal of the sampling frequency which has thus been detected is outputted from the signal generation unit. During the interval until a clock signal of the same frequency as the sampling frequency of the audio data which has changed is outputted from the signal generation unit, the operation of the digital amp becomes unstable, and, during this interval, the audio is sometimes interrupted. Methods for eliminating this interruption of the audio are proposed in Japanese Laid-Open Patent Publication 2002-344561 and Japanese Laid-Open Patent Publication 2004-23216.

To explain Japanese Laid-Open Patent Publication 2002-344561 in simple terms, the audio data which is being inputted (i.e., the audio data before change thereof) is stored in a first buffer, and the audio data which is stored in this first buffer is processed using a clock signal of the same frequency as the sampling frequency of this audio data, with the resulting audio being outputted. When it is detected that the sampling frequency of the audio data has changed, the audio data after this change is stored in a second buffer. Thereafter, when all of the audio data which is stored in the first buffer (i.e., all of the audio data before the change of sampling frequency) has been processed, the frequency of the clock signal is changed over to the sampling frequency of the audio data which is stored in the second buffer, and subsequently the audio data which is stored in the second buffer is processed.

To explain Japanese Laid-Open Patent Publication 2004-23216 in simple terms, for a fixed time period, while the device which is inputting the audio data is being changed over, "mute" is applied so as to stop the output of audio, and the audio data which has been inputted is replayed after a delay of just this time period that "mute" has been applied. Furthermore, during the interval while this "mute" is being applied, the frequency of the clock signal is changed over to the new sampling frequency of the audio data which is being inputted.

However, with the device proposed in Japanese Laid-Open Patent Publication 2002-344561, two buffers must be provided for storing the audio data. Furthermore, a microcomputer of high processing speed and of high performance must be provided, in order to change over at high speed the buffer in which the audio data which is being inputted is stored, when it has been detected that the sampling frequency of the audio data which is being inputted has changed. Due to this, the problem has arisen of increase in the cost of the basic unit.

It should be understood that although, in Japanese Laid-Open Patent Publication 2002-344561, a structure is also described in which only one buffer needs to be provided for the storage of the audio data which is being inputted, this is a device for reducing the amount of audio data which is lost (i.e. the amount of audio data which is not replayed) when the sampling frequency of the audio data has changed, rather than being a device which is capable of preventing audio interruptions.

Furthermore, the device proposed in Japanese Laid-Open Patent Publication 2004-23216 is one which is based upon the concept that the sampling frequency of the audio data which is being inputted changes, when the device which is inputting the audio data is changed over. However, with DVD-AUDIO, the sampling frequency of the audio data is not fixed, but is sometimes different between the different tracks (i.e. between different songs). Furthermore, with DVD-VIDEO, the sampling frequency of the audio data is not fixed, but sometimes is different between the different chapters and titles. Accordingly, with the device proposed in Japanese Laid-Open Patent Publication 2004-23216, during the replay of a DVD in which the sampling frequency of the recorded audio data is not uniform, if the sampling frequency of the audio data which is being inputted changes, it is not possible to eliminate interruption of the audio after such change of the sampling frequency.

It should be understood that both Japanese Laid-Open Patent Publication 2002-344561 and Japanese Laid-Open Patent Publication 2004-23216 are proposals for a digital amp.

The objective of this invention is to provide an optical disk replay device with which interruption of the audio, when the sampling frequency of the audio data which is recorded upon an optical disk such as a DVD or the like changes, is eliminated, and moreover with which no increase in cost of the basic unit is entailed.

SUMMARY OF THE INVENTION

According to the present invention, there is included a detection unit which detects a break in the data which is recorded upon an optical disk, when this data recorded upon this optical disk is being read in and replayed by a reading unit. Furthermore, there is included an audio output stoppage command unit which, when a break is detected by this detection unit, commands a digital audio processing device which is connected to the audio output unit to stop the output of audio. This audio output unit outputs a digital audio signal based upon the data which has been read in from the optical disk by the reading unit. Furthermore, there is included a sampling frequency checking unit which checks whether or not the sampling frequency of the audio data before a break in data which has been detected by the detection unit, and the sampling frequency of the audio data after this break, are the same. Moreover, there is provided an audio output stoppage elimination command unit which, when it has been detected by the sampling frequency checking unit that the sampling frequency of the audio data before a break in data which has been detected by the detection unit, and the sampling frequency of the audio data after this break, are not the same, along with waiting until a fixed time period has elapsed, and returning the reading position upon the optical disk at which the reading unit reads in data to a position directly after the break in data which has been detected by the detection unit, also commands the digital audio processing device to eliminate the stoppage of output of audio.

The detection unit, for example, in the case of DVD-AUDIO, detects a position at which the track changes over as being a break, and, in the case of DVD-VIDEO, detects the position at which the chapter or the title changes over as being a break. And, when a break in the data is detected by the detection unit, an audio output stoppage command unit commands a digital audio processing device, such as a digital amp or the like, which is connected to the audio output unit, to stop the output of audio—for example, to apply "mute".

When it is checked by the sampling frequency checking unit that the sampling frequencies for the audio data before and after a break which has been detected this time by the detection unit are not the same, in other words, that the sampling frequency of the audio data has changed, then the audio output stoppage elimination unit waits for a fixed time period to elapse. This fixed time period may be set to a time period (around 1 to 2 seconds) which is required for the digital audio processing device, upon change of the sampling frequency of the audio data, to change over the frequency of a clock signal to the sampling frequency of the audio data after it has changed. And the audio output stoppage elimination command unit, after this fixed time period has elapsed, along with returning the position at which the reading unit is reading in data to a position directly after the break in data which was detected this time, also commands the digital audio processing device to cancel the stoppage of audio output—for example, to cancel "mute".

DETAILED DESCRIPTION OF THE INVENTION

Figure 1:
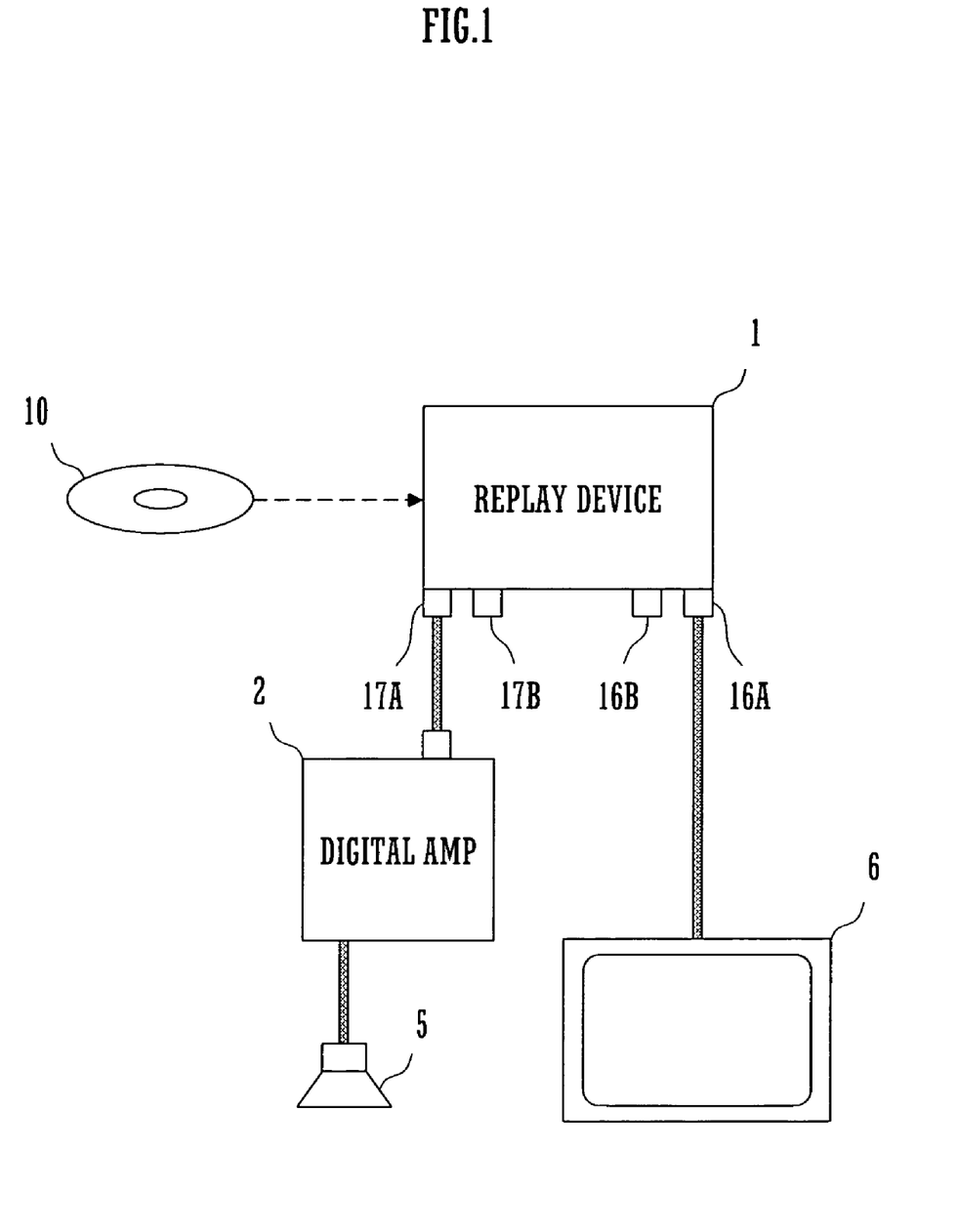
FIG. 1 is a figure showing a connection between a replay device according to an embodiment of the present invention, and a digital amp.

As shown in FIG. 1, the optical disk replay device of the present invention (hereinafter simply termed a "replay device") comprises a D-audio output terminal 17A which outputs an audio signal as a digital audio signal. A digital amp 2 is connected to this D-audio output terminal 17A, and accordingly the replay device 1 is able to replay audio by employing this digital amp 2. A speaker 5 which outputs this audio is connected to the digital amp 2. Furthermore, the replay device 1 comprises an A-audio output terminal 17B which outputs this audio signal as an analog audio signal. Moreover, the replay device 1 comprises a D-video output terminal 16A which outputs a video signal as a digital video signal, and an A-video output terminal 16B which outputs this video signal as an analog video signal. A display device 6 having a digital input terminal can be connected to the D-video output terminal 16A, while a display device 6 (not shown) having an analog input terminal can be connected to the A-video output terminal 16B. FIG. 1 shows a case in which a display device 6 of the first type is connected to the D-video output terminal 16A, while a digital amp 2 is connected to the D-audio output terminal 17A.

Figure 2:
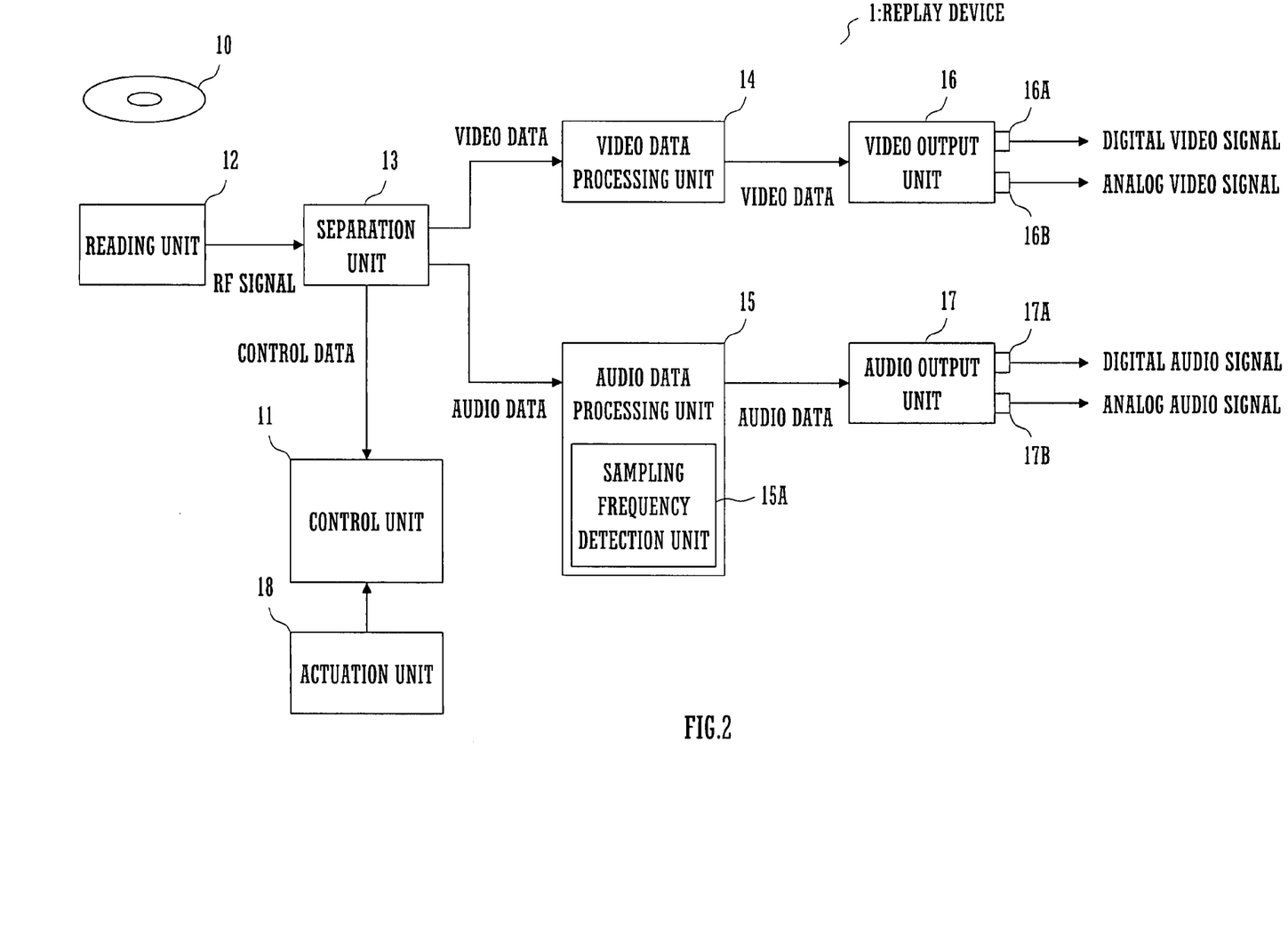
FIG. 2 is a block diagram showing the structure of a main portion of the replay device according to this embodiment.

FIG. 2 is a block diagram showing the structure of the main portion of this replay device which is an embodiment of the present invention. This replay device 1 comprises a control unit 11 which controls the operation of the main portion thereof, and a reading unit 12 which reads in data recorded on a DVD 10. Furthermore, the replay device 1 comprises a separation unit 13 which separates the video data and the audio data which have been read in by the reading unit 12, a video data processing unit 14 which processes the video data which has thus been separated out by the separation unit 13, and an audio data processing unit 15 which processes the audio data which has likewise been separated out by the separation unit 13. Moreover, there are included a video output unit 16 which outputs the video data which has been processed by the video data processing unit 14, an audio output unit 17 which outputs the audio data which has been processed by the audio data processing unit 15, and an actuation unit 18 which receives input actuation for this device main body. In fact the control unit 11 is connected to various different portions of the relay device, but some of these connections are not shown in FIG. 2 in the interests of simplicity. The control unit 11 comprises a memory in which is stored management information for the audio files and/or video files which are recorded upon the DVD 10. This management information for the audio files and/or the video files which are recorded upon the DVD 10 is recorded in a predetermined recording area. The replay device 1 reads in the management information which is recorded in this predetermined area of the DVD 10, and stores it in the memory of the control unit 11. In this management information, there are included various items of information for each file recorded upon the DVD 10, the starting 5 address of this file, its ending address, its title, and so on.

The reading unit 12 comprises a per se known type of pickup head (not shown in the drawing) which shines laser light onto the DVD 10, and reads in the data which is recorded upon the DVD 10 by detecting the reflected light. Based upon the reflected light from the DVD 10 which has thus been detected by the pickup head, the reading in head obtains a read signal (an RF signal), a tracking error signal (a TE signal), and a focus error signal (an FE signal). Furthermore, the reading unit 12 includes a servo control unit (also not shown in the drawings) which performs tracking servo control and focus servo control based upon the TE signal and the FE signal, thereby controlling the position upon the DVD 10 at which the laser light shines. Since this tracking servo control and focus servo control may be of per se conventional types, they will not be particularly explained herein. And the reading unit 12 outputs the RF signal. This RF signal is a signal in which encoded video data and audio data are multiplexed. Furthermore, control data is included in the RF signal in association with the video data and audio data, and is used when replaying this video data and audio data. This control data may be, for example, data for synchronizing the video and the audio during replay, data which specifies breaks in the data, and the like.

The separation unit 13 processes the RF signal which has been inputted, and separates the video data, the audio data, and the control data. The video data and the audio data which have thus been separated are data encoded according to MPEG or the like. The separation unit 13 outputs the video data to the video data processing unit 14, and outputs the audio data to the audio data processing unit 15. Furthermore, it outputs the control data to the control unit 11. The video data processing unit 14 decodes the video data which has been thus inputted from the separation unit 13, and inputs the decoded video data to the video output unit 16. In this video output unit 16, the above described D-video output terminal 16A and A-video output terminal 16B are provided. The video output unit 16 outputs to the D-video output terminal 16A a signal (a digital video signal) based upon the video data which has been inputted from the video data processing unit 14 (the decoded video data). Furthermore, it creates an analog video signal based upon the video data which has been inputted from the video data processing unit 14 (the decoded video data), and outputs this analog video signal to the A-video output terminal 16B.

The audio data processing unit 15 decodes the audio data which has been inputted from the separation unit 13, and inputs the decoded audio data to the audio output unit 17. Furthermore, the audio data processing unit 15 comprises a sampling frequency detection unit 15A which detects the sampling frequency of this decoded audio data. The above described D-audio output terminal 17A and A-audio output terminal 17B are provided to the audio output unit 17. The audio output unit 17 outputs to the D-audio output terminal 17A a signal (a digital audio signal) based upon the audio data which has been inputted from the audio data processing unit 15 (the decoded audio data). Furthermore, it creates an analog audio signal based upon the audio data which has been inputted from the audio data processing unit 15 (the decoded audio data), and outputs this analog audio signal to the A-audio output terminal 17B. The actuation unit 18 comprises a plurality of actuation keys (not shown in the figure) which perform input actuation to the main body of the device upon being actuated by the user, and a remote control reception unit (also not shown in the figure) which receives control codes transmitted by a remote control device (also not shown).

Furthermore, the video output unit 16 performs transmission of control signals to a display device 6 which is connected via the D-video output terminal 16A, and reception of control signals which have been transmitted from this display device 6. Moreover, the audio output unit 17 performs transmission of control signals to a digital amp 2 which is connected via the D-audio output terminal 17A, and reception of control signals which have been transmitted from the digital amp 2.

Figure 3:
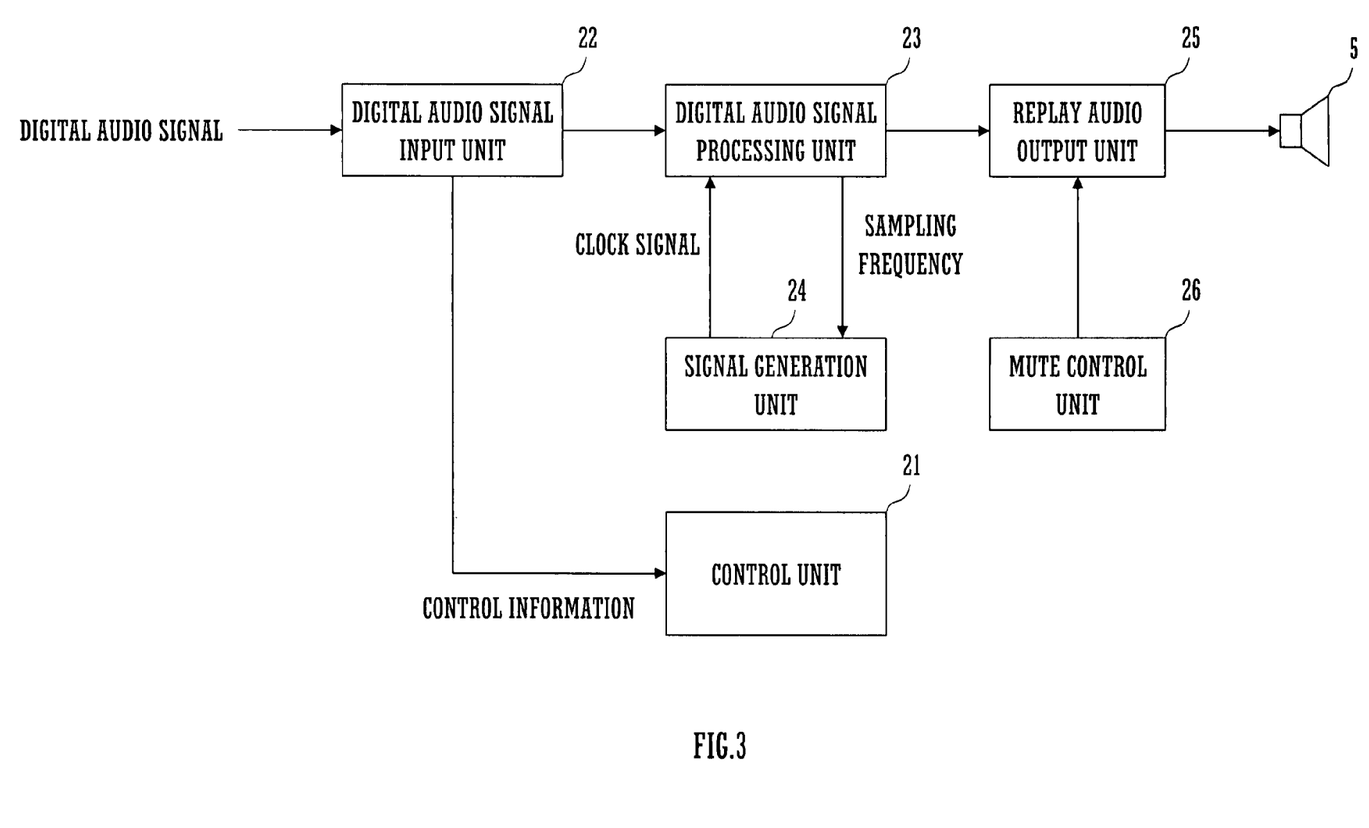
FIG. 3 is a figure showing the structure of a main portion of the digital amp.

FIG. 3 is a figure showing the structure of the main portion of a digital amp which is connected to the D-audio output terminal of the replay device of this embodiment. This digital amp 2 comprises a control unit 21 which controls the operation of the main body thereof, a digital audio signal input unit 22 to which a digital audio signal is inputted, and a digital audio signal processing unit 23 which processes the digital audio signal which has been inputted to the digital audio signal input unit 22. Furthermore, it comprises a signal generation unit 24 which supplies a clock signal to the digital audio signal processing unit 23, and a replay audio output unit 25 which drives a connected speaker 5 with the digital audio signal which has been processed by the digital audio signal processing unit 23. Furthermore, it comprises a mute control unit 26 which performs mute control.

The digital audio signal which has been outputted from the D-audio output terminal 17A provided to the audio output unit 17 of the above described replay device 1 is inputted to the digital audio signal input unit 22. To this digital audio signal input unit 22 there is provided a buffer (not shown in the figure) which temporarily stores this inputted digital audio signal. Furthermore, this digital audio signal input unit 22 is also employed in communication of control signals to and from the above described replay device 1. When a control signal has been transmitted from the replay device 1 and has arrived, the digital audio input unit 22 notifies the control unit 21 thereof. The digital audio signal processing unit 23 processes the digital audio signal which has been inputted, and, along with obtaining the audio data therefrom, also detects the sampling frequency of this audio data, and notifies the signal generation unit 24 of this sampling frequency. The signal generation unit 24 comprises a signal generation element (not shown in the figures) which generates a standard clock signal, and this standard clock signal is frequency divided and outputted as a clock signal. The signal generation unit 24 generates a clock signal of the sampling frequency of the audio data which has been notified from the digital audio signal processing unit 23, and supplies it to the digital audio signal processing unit 23. And the replay audio output unit 25 is a drive circuit which drives the connected speaker 5 with the audio signal which has been processed by the digital audio signal processing unit 23. Finally, the mute control unit 26 performs control to stop the driving of the speaker 5 by the replay audio output unit 25.

In the following, the replay operation of this replay device 1 according to this embodiment of the present invention will be explained.

Figure 4:
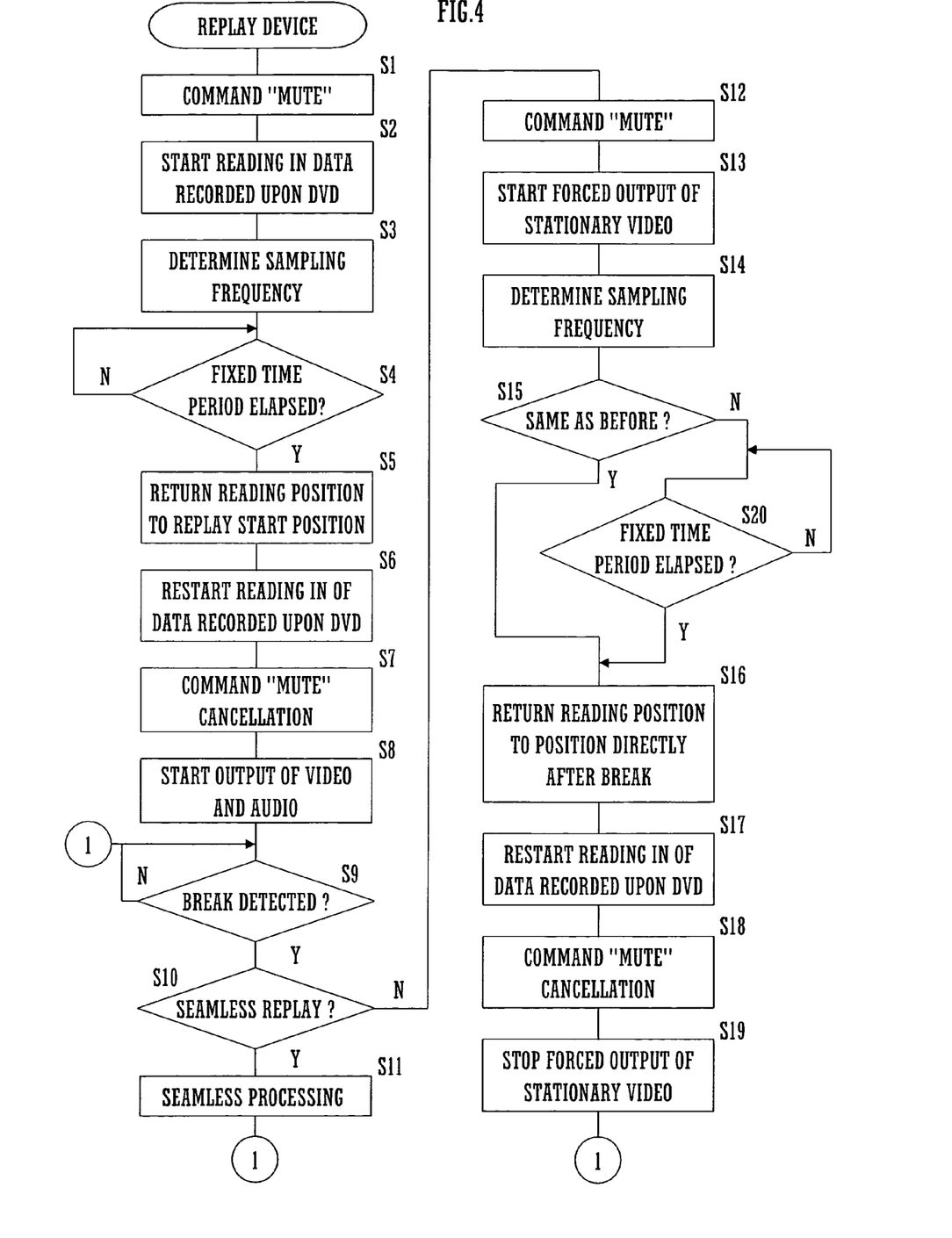
FIG. 4 is a flow chart showing the flow of a routine which is executed during the replay operation of the replay device according to this embodiment.

FIG. 4 is a flow chart showing the flow of a procedure which is executed by the device of this embodiment for performing replay operation. When a DVD 10 is put into the replay device 1, the management information which is recorded in the predetermined recording region of this DVD 10 is read in, the files (audio files or video files) which are recorded upon this DVD 10 are distinguished, and management information such as the recording start position and the file name for each of these recorded files is obtained. When the replay device 1 has detected the actuation of a replay key which is provided upon the actuation unit 18, or when it has received, at the actuation unit 18 a control signal for the start of replaying which has been transmitted from a remote control device (not shown), then it starts to execute the processing shown in FIG. 4.

It should be understood that, since the processing shown in FIG. 4 is processing which is effective when replaying using a digital amp such as the digital amp 2, it would also be acceptable to arrange for the user to be able to select whether or not to perform replaying by using this processing; or, alternatively, it would also be acceptable to arrange to detect whether or not a digital amp 2 is connected to the D-audio output terminal 17A, and to execute this FIG. 4 processing if a digital amp 2 has been thus detected.

When the user commands a DVD 10 to be replayed, the replay device 1 commands (in a step S1) the digital amp 2 to apply "mute". This command is outputted from the D-audio output terminal 17A, and is supplied to the digital amp 2. According to this command, the digital amp 2 applies "mute". Thereby, a state is established in which the audio is no longer outputted from the speaker 5 which is connected to the digital amp 2. The replay device 1 starts (in a step S2) the reading in by the reading unit 12A of the data which is recorded upon the DVD 10. The data which has thus been read in from the DVD 10 by the reading unit 12 is inputted to the separation unit 13. The separation unit 13 performs processing in order to separate the RF signal which has been inputted into various different types of data, such as video data, audio data, control data and the like. The video data which has been thus separated out by the separation unit 13 is inputted to the video data processing unit 14. Furthermore, the audio data which has been separated out by the separation unit 13 is inputted to the audio data processing unit 15. Moreover, the control data which has been separated out by the separation unit 13 is inputted to the control unit 11.

At this time, the operation of the video data processing unit 14 is stopped, and the video data which is inputted thereto from the separation unit 13 is not processed. Accordingly, the video output unit 16 does not output any video signal at this time point, and thus a state is established in which no display of video is performed by the display device 6 connected thereto. On the other hand, the operation of the audio data processing unit 15 is not stopped, and, along with decoding the audio data which is inputted to it from the separation unit 13, it determines with the sampling frequency detection unit 15A (in a step S3) the sampling frequency of the audio data which it has thus decoded. And the audio output unit 17 outputs a digital audio signal, based upon the audio data which has thus been decoded by the audio data processing unit 15, to the D-audio terminal 17A, with this signal thus being inputted to the digital amp 2 which is connected thereto. The digital amp 2 processes this digital audio signal which has been inputted from the replay device 1. At this time, the digital audio signal processing unit 23 detects the sampling frequency of the audio data which has been obtained from the digital audio signal being inputted from the replay device 1. Furthermore, the signal generation unit 24 generates a clock signal of this sampling frequency which has been detected, and supplies it to the digital audio signal processing unit 23. At this time no audio is being outputted from the speaker 5, since the replay audio output unit 25 has applied "mute" to the mute control unit 26.

When a fixed time period has elapsed (in a step S4) after the processing performed in the step S3, the replay device 1 returns (in a step S5) the position at which the data recorded upon the DVD 10 is being read in by the reading unit 12 to the replay start position this time, and restarts (in a step S6) the reading in of data from the DVD 10. This fixed time period in the step S4 should be the time period which is required until it is possible for the digital audio signal processing unit 23 to check the sampling frequency of the audio data which is recorded upon the DVD 10, and for the signal generation unit 24 to supply a clock signal of the same frequency which has thus been checked to the digital audio signal processing unit 23; and typically it is a time period of around 1 to 2 seconds. Furthermore, the replay device 1 commands (in a step S7) the digital amp 2 to cancel "mute". Due to this, the digital amp 2 cancels the mute state. Furthermore, the replay device 1 starts (in a step S8) the operation of the video data processing unit 14. Due to this, the outputting (both digital and analog) of the video signal from the video output unit 16 and the outputting (both digital and analog) of the audio signal from the audio output unit 17 are both started. Accordingly, along with the display of video being started by a display device (not shown in the figure) which is connected to the D-video output terminal 16A or to the A-video output terminal 16B of the video output unit 16, also the output of audio is started by the speaker 5 connected to the digital amp 2 which is connected to the D-audio output terminal 17B, or by a speaker (not shown in the figure) which is connected to the A-audio output terminal 17B.

It should be understood that the digital amp 2 processes the digital audio signal which has been inputted to the digital audio signal input unit 22 with the digital audio signal processing unit 23 in approximately real time, and outputs an audio signal based upon this audio data which has thus been processed to the replay audio output unit 25.

In this manner, when it receives a command for the starting of replay, the replay device 1 of this embodiment waits until a state of affairs transpires in which it is possible for the digital amp 2 to perform processing of the audio data properly, and starts replay from the replay position at this time. Accordingly, problems such as interruption of the audio directly after the start of replay, and the like, do not occur.

After the replay of the DVD 10 has been started, the replay device 1 makes a decision (in a step S9) as to whether or not the replay position has arrived at a break in the data recorded upon the DVD 10. Here by a break in the data is meant, in the case of DVD-AUDIO, a position at which the track changes over, and, in the case of DVD-VIDEO, a position where the chapter or the title changes over. With a DVD 10, the sampling frequency of the audio data is determined for each sequence of audio data in which no such break is present. Although, due to this, the sampling frequency is the same for each sequence of audio data in which no such break is present, sometimes the sampling frequency of the audio data changes across such a break. Furthermore, information which indicates the breaks in the data is recorded upon the DVD 10 as control data, and the replay device 1 performs the decision in the step S9 according to this control data.

If it has been decided in the step S9 that a break in the data has been arrived at, then the replay device decides (in a step S10) whether or not seamless replay is currently selected. As is per se well known, by seamless replay is meant a replay method in which, with DVD-AUDIO, a no-sound state does not occur between tracks (between songs). If in the step S10 it is decided that seamless replay is currently selected, then the replay device 1 performs (in a step S11) processing as is appropriate for seamless replaying, in other words, it performs seamless processing in order to ensure than a no-sound state does not occur between tracks (between songs); and then the flow of control returns to the step S9.

On the other hand, if in the step S10 it is decided that seamless replay is not selected, then the replay device 1, along with issuing a command to the digital amp 2 so that "mute" is applied, also starts stationary video forced output (in steps S12 and S13) from the video output unit 16 of the video directly before the break which has been detected this time, which is output as stationary video. The digital amp 2 applies "mute" according to this command from the replay device 1. Due to this, the output of audio from the speaker 5 is stopped. Moreover, the replay device 1 decides (in a step S14) upon the audio data sampling frequency for the data subsequent to the break which has been detected this time. In this step S14, just as in the above described step S3, the sampling frequency is repeatedly detected for a fixed amount of audio data after the break which has been detected this time, and the audio data sampling frequency subsequent to the break which has been detected this time is determined upon based upon the result of this detection.

Thus, with this replay device 1 of this embodiment, the sampling frequency of the audio data subsequent to this break is determined upon, based upon the result of repeatedly performing processing for repeatedly detecting the sampling frequency for a fixed amount of audio data recorded upon the DVD 10 (for example, for an amount of audio data for which the replay time is around 0.5 seconds). Accordingly, it is possible to guarantee sufficient accuracy for the determination of the sampling frequency of the audio data subsequent to the break.

Furthermore, even after a break in the data has been detected in the step S9, the reading in of the data recorded upon the DVD 10 by the reading unit 12 is continued. Moreover, the operation of the audio data processing unit 13 and of the audio output unit 17 is also continued. Accordingly, a digital audio signal based upon the audio data subsequent to the break which has been detected this time is inputted to the digital amp 2. In the digital amp 2, the sampling frequency of the audio data obtained from the digital audio signal which the digital audio signal processing unit 23 is inputting is always detected.

When the replay device 1 has determined in the step S14 the sampling frequency of the audio data subsequent to the break which has been detected this time, it decides (in a step S15) whether or not this sampling frequency is the same as the sampling frequency of the audio data before this break. And, if it is decided in the step S15 that they are the same, the replay device 1 returns (in a step S16) the reading position of the reading unit 12 upon the DVD 10 to the start of the data directly after the break which has been detected this time, and restarts (in a step S17) the reading in of the data recorded upon the DVD 10 from this position. Furthermore, it commands (in a step S18) the digital amp 2 to cancel the "mute" state. Moreover (in a step S19) it stops the forced output of stationary video from the video output unit 16, and switches over to the output of video based upon the video data recorded upon the DVD 10.

On the other hand, if it has been decided, in the decision of the step S15, that the sampling frequency in the step S14 is not the same as the sampling frequency before the break, then the replay device 1 waits (in a step S20) until a fixed time period has elapsed. This fixed time period is the time period which is required until it is possible for the signal generation unit 24 of the digital amp to supply to the digital audio signal processing unit 23 a clock signal of the same frequency as the sampling frequency of the audio data after the break which has been detected this time, and is typically from 1 to 2 seconds. And, when in the step S20 the replay device 1 has decided that this fixed time period has elapsed, then it performs the processing of the above described steps S16 through S19, and then returns the flow of control to the step S11.

In this manner, with the replay device 1 of this embodiment, the digital amp 2 is commanded to establish the "mute" state, when a break in the data is detected at which there is a possibility that the sampling frequency of the audio data recorded upon the DVD 10 changes. Accordingly, even if the operation of the digital amp 2 becomes unstable because the sampling frequency of the audio data changes over the break which has been detected here, random noise or the like is not outputted at this time from the speaker connected to the digital amp 2. Furthermore since it is arranged, even if the sampling frequency of the audio data has changed over the break which has been detected here, to return, in the step S16, the reading position of the reading unit 12 upon the DVD 10 to the start of the data directly after the break which has been detected this time, accordingly no problem arises of the data (video and audio) directly after this break not being replayed. Moreover since it is arranged, even if the sampling frequency of the audio data has not changed over the break which has been detected, in the same manner, to return, in the step S16, the reading position of the reading unit 12 upon the DVD 10 to the start of the data directly after the break which has been detected this time, accordingly no problem arises of the data directly after this break not being replayed. Thus, even when the sampling frequency of the audio data recorded upon the DVD 10 has changed, it is possible to eliminate interruption of the audio based upon this audio data after the change of the sampling frequency. Moreover, the possibility of an increase in the cost of the device itself is suppressed, since this countermeasure can be implemented merely with a change in the software of the replay device 1.

It should be understood that although, in the above described embodiment, the structure was such that each of the replay device 1 and the digital amp 2 detected the sampling frequency of the audio data by itself, it would also be acceptable, as an alternative, to arrange for the replay device 1 to notify the digital amp 2 of the sampling frequency of the audio data, which it has detected in the step S3 or S14. In this case, it would be proper to provide a structure in which the signal generation unit 24 supplies, to the digital audio signal processing unit 23, a clock signal which is of the same frequency as the sampling frequency of the audio data which has been notified from the replay device 1 to the digital amp 2.

Finally, the various features of the embodiment described above are all cited by way of example, and must not be considered as being particularly limitative of the present invention. The range of the present invention is specified by the scope of the appended Claims, and not by any of the features of the embodiment described above. Furthermore, it is intended that all changes within the meaning and the scope of the Claims, and equivalents thereof, should be included within the scope of the present invention.

What is claimed is:

1. An optical disk replay device, comprising:
   a reading unit which reads in video data and audio data recorded upon an optical disk;
   a decoding unit which decodes the video data and the audio data read in from an optical disk by the reading unit;
   an audio output unit which outputs, to a digital amp, a digital audio signal based upon the audio data decoded by the decoding unit;
   a video output unit which outputs, to a display device, a video signal based upon the video data decoded by the decoding unit;
   a detection unit which, when reading in the video data and the audio data recorded upon the optical disk by the reading unit and replaying the video and audio data, detects as a break in data a position at which a chapter of the video and audio data switches over;
   an output stoppage command unit which, when the break in data is detected by the detection unit, commands the digital amp connected to the audio output unit to stop outputting audio, and commands the video output unit to output to the display device, instead of the video signal, a stationary video signal showing a stationary video directly before the break in data detected this time;
   a sampling frequency deciding unit which:
      repeatedly detects a sampling frequency for a fixed amount of the audio data before and after the break in data detected by the detection unit; determines the sampling frequency of the audio data before and after the break in data based upon the sampling frequency repeatedly detected, and
      decides whether or not the sampling frequency of the audio data before the break in data, and the sampling frequency of the audio data after the break in data, are the same; and an output stoppage elimination command unit which, when the sampling frequency deciding unit detects that the sampling frequency of the audio data before the break in data detected by the detection unit, and the sampling frequency of the audio data after this break, are not the same:
- waits until a fixed time period elapses and returns the reading position upon the optical disk at which the reading unit reads in data to a position directly after the break in data detected by the detection unit,
- commands the digital amp to eliminate the stoppage of output of audio, and
- further commands the video output unit to switch an output to the display device from the stationary video signal to the video signal, wherein the output stoppage elimination command unit, when the sampling frequency deciding unit detects that the sampling frequency of the audio data before the break in data detected by the detection unit, and the sampling frequency of the audio data after this break, are the same:
- does not wait until the fixed time period elapses and returns the reading position upon the optical disk at which the reading unit reads in data to a position directly after the break in data detected by the detection unit,
- commands the digital amp to eliminate the stoppage of output of audio, and
- further commands the video output unit to switch an output to the display device from the stationary video signal to the video signal.

* * * * *